United States Patent [19]

Brattgard

[11] Patent Number: 4,581,526

[45] Date of Patent: Apr. 8, 1986

[54] APPARATUS FOR PHOTOELECTRIC DETECTION OF OBJECTS

[75] Inventor: Bengt O. I. Brattgard, Landskrona, Sweden

[73] Assignee: Besam Aktiebolag, Landskrona, Sweden

[21] Appl. No.: 501,214

[22] Filed: Jun. 6, 1983

[30] Foreign Application Priority Data

Jun. 15, 1982 [SE] Sweden ................................ 8203720

[51] Int. Cl.⁴ ............................................... G01V 9/04
[52] U.S. Cl. .................... 250/221; 250/222.1; 250/239; 340/555
[58] Field of Search ...................... 250/221, 222.1, 239, 250/228; 350/96.28; 340/555, 556, 557

[56] References Cited

U.S. PATENT DOCUMENTS 4,042,821 8/1977 Mierzwinski ........................ 250/239
4,336,993 6/1982 Banton ................................ 350/96.1
4,434,363 2/1984 Yorifuji et al. ........................ 250/221

Primary Examiner—David C. Nelms
Assistant Examiner—J. Gatto
Attorney, Agent, or Firm—Jordan and Hamburg

[57] ABSTRACT

The invention comprises a unit (1) implemented with two elongate chambers (3, 4) provided with openings or gaps (7, 8) on one wall (5, 6). At one end of one chamber one or more LED (9) are adapted, and opposite hereto at the end of the other chamber there is arranged a receiving means (10). After one or more reflections by the reflecting walls of the first chamber (3) the radiation departs through the opening or gap (7) and after reflection by an object (13) on the outside returns through the gap (8) of the other chamber (4), to be reflected by the mirror walls of the chamber such as to strike the receiving means (10) after reflection.

11 Claims, 5 Drawing Figures

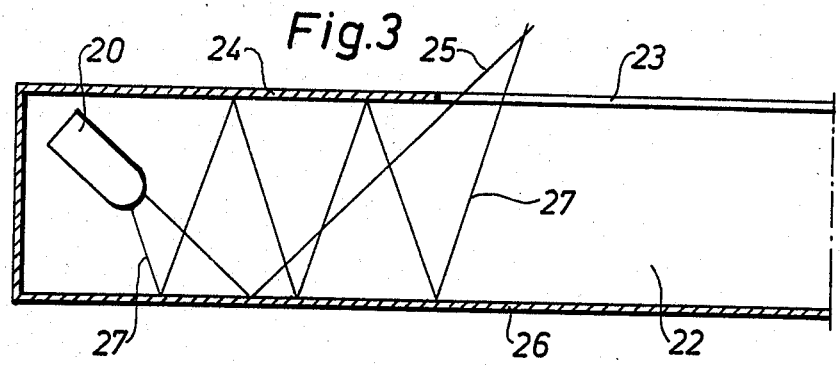
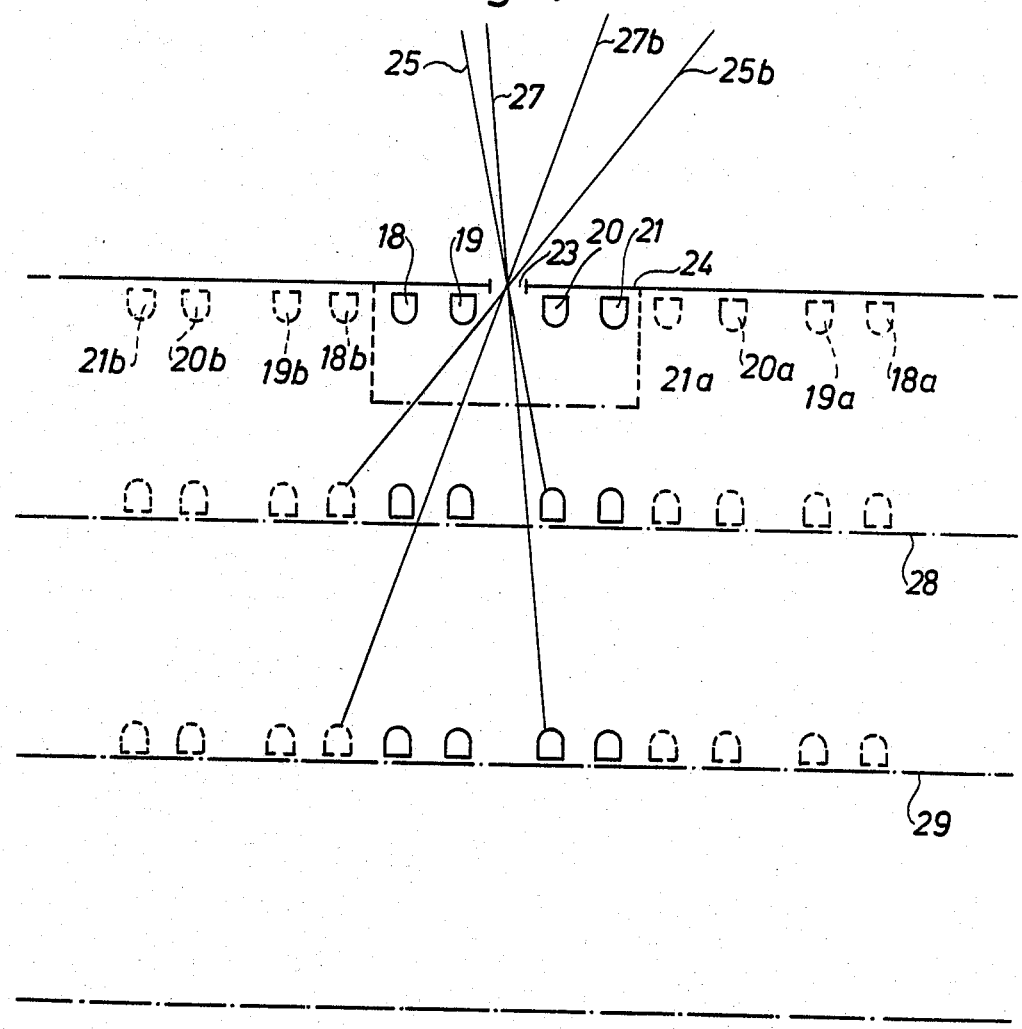

APPARATUS FOR PHOTOELECTRIC DETECTION OF OBJECTS

Detection means are very usual these days in conjunction with doors, e.g. power operated doors where detection means sense whether a person or an object is moving towards the door, in this way guiding the function of the door operating machinery for opening the door. Many types of apparatus are already on the market and operate according to different principles. A usual principle is to allow light within the infrared (IR) wavelength range to irradiate the space in front of the door and arrange sensors for this radiation when it is reflected, e.g. by a person on his way to the door. Simpler photocell apparatus functions such that a light beam is interrupted by a person moving towards the door. Taking into account that interruption of a light beam requires apparatus situated relatively far away from the door itself, this is generally not so suitable in most practical cases. If the entrance area in front of the door can be monitored, this is to be preferred.

The present invention relates to an apparatus preferably working with radiation within the invisible wavelength range, which is a simple solution to the problem of monitoring a space, e.g. in front of a power operated door. The invention can naturally be applied to other detection or monitoring purposes, e.g. in conjunction with safety devices for machines that have hazardous handling operations. Further examples of the application of the invention can be in safety systems for backing vehicles, arresting systems for automatic trucks and other warning and indication applications. The apparatus in accordance with the invention substantially comprises an elongate unit including radiation transmission and receiving means, respectively arranged in a casing in the form of a chamber one long side of which is opened up for outgoing radiation and incoming reflected radiation. Both chambers are suitably arranged side by side with the openings facing the area to be detected.

The invention is characterized by the disclosures in the following claims.

The invention will now be described in detail with reference to the appended drawings, whereon FIG. 1 schematically illustrates an apparatus in accordance with the invention where some simple ray paths are drawn in.

FIG. 3 illustrates the ray path in a chamber seen from one side.

FIG. 4 is an explanatory Figure schematically illustrating the ray paths achieved by the reflecting conditions prevailant in the casing between its walls, when the chamber cross-section is rectangular.

Figure 1:
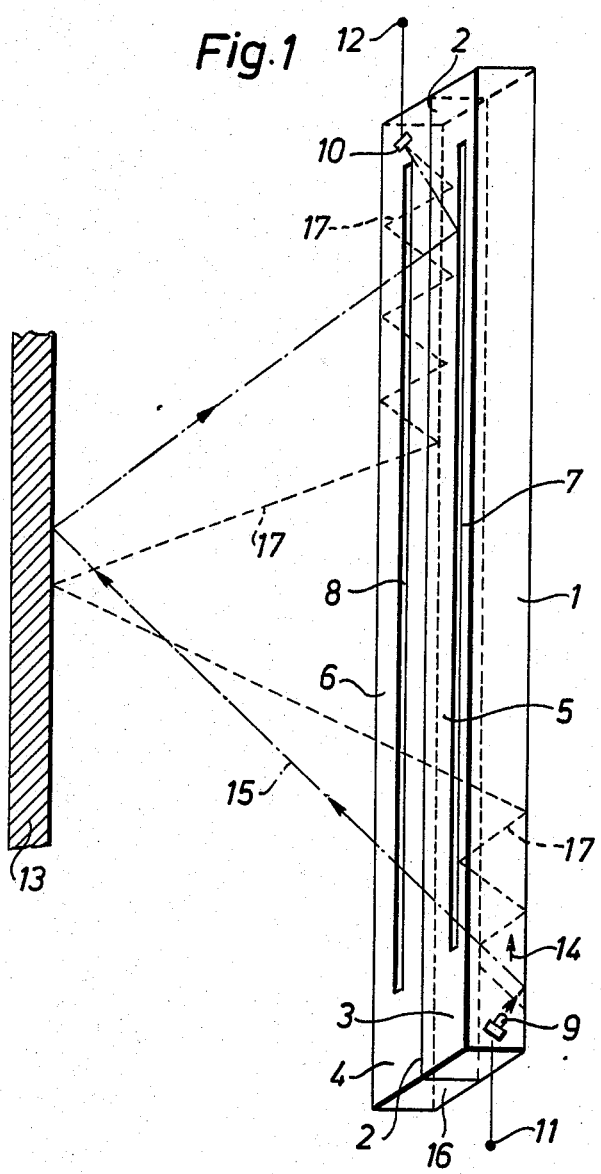

The apparatus illustrated in FIG. 1 comprises a boxlike unit 1, internally provided with a partition wall 2 so that two elongate chambers 3, 4 are formed. One wall 5, 6 of each chamber is formed with an opening or gap 7 and 8, respectively. A light-emitting means 9, e.g. a light-emitting diode (LED) is placed at one end of the chamber 3. A receiving element 10 is placed at the opposite end of each chamber 4. The light emitting means 9 is provided with a terminal 11 for connecting to an unillustrated driving circuit, while the receiving element 10 is provided with a terminal 12 for connecting to a receiving circuit, e.g. for controlling operational circuits associated with power equipment. The interior walls of the chambers are treated so that they can serve as mirror surfaces.

The apparatus functions in the following manner. Let it be assumed that there is an object 13 at a given distance from the surfaces provided with openings 7, 8. The light emitting means 9 is directed at an angle to the bottom 14 of the chamber 3, and it emits rays, such as the ray denoted by chain-dotted lines 15, which are reflected by the interior surface of the bottom 14. After reflection the rays pass through the opening 7 and become incident on the object 13. The rays incident on it are reflected by the object 13, and pass through the opening 8 into the chamber 4, not far away from the light-receiving element 10.

After reflection by the interior surface of the bottom wall 16 of the chamber 4, the ray 15 is caught by the receiving element 10 and the resulting signal generated is taken via the terminal 12 to the unillustrated receiving circuit. The simple reflection path illustrated by the chain-dotted lines 15 is naturally only one of many such paths. A not unusual course for a ray is illustrated by the dashed lines 17. The radiation from the means 9 is in this case reflected a plurality of times between the inner surfaces of the walls 5 and 14 in the chamber 13, until the ray direction is such that it leaves the chamber through the opening 7 instead of being reflected by the inner surface of the wall 5. As described for the ray path 15, the ray 17 strikes the object 13 and is reflected back again through the opening 8 into the chamber 4. The ray may then be reflected a plurality of times between the inner surfaces of the walls 6 and 16 until it is received by the receiving element 10. The advantage with multiple reflection and the course of reflection in general will be more closely described in conjunction with FIGS. 2–4.

Figure 2:
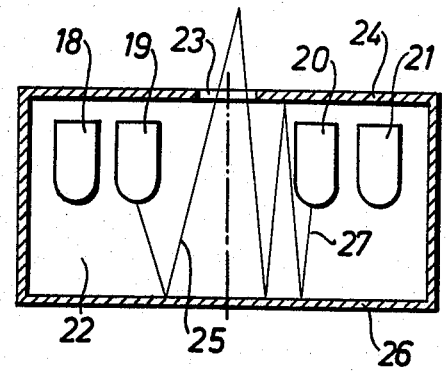
FIG. 2 is a section through a chamber having radiation transmission means.

FIG. 2 illustrates the arrangement of four LED's 18, 19, 20, 21 at one end of a chamber 22. As will be seen from the Figure, the LED's are arranged under the wall 24 of the chamber provided with the opening 23. The Figure also illustrates a ray 25 starting from the LED 19, this ray being reflected once against the inner surface of the chamber bottom wall 26. According to the laws of reflection, the angles of incidence and reflection of the ray 25 are symmetrical about the normal to the bottom surface 26. As will be seen, the ray goes out of the slit 23 at an angle. If the ray path 27 from the LED 20 is followed it will be seen that this has a departure angle from the diode, relative to the bottom 26, such that multiple reflection between the inner surfaces of the walls 24 and 26 occurs. After some reflections the ray 27 reaches the opening 23 and departs through it. It should be noted that due to the multiple reflection and the original direction of incidence to the bottom 26, the ray 27 obtains a considerably less inclination on exiting the opening 23 than the ray 25. By arranging a plurality of LED's in the manner illustrated, the rays reflected in the chambers a plurality of times will be in the majority when the rays pass through the opening, which signifies that by the symmetrical arrangement there occurs maximum radiation intensity in a direction straight out from the opening. From this it also follows that by an asymmetric arrangement of the LED's, a direction of ray concentration can be selected which is suited to prevailing requirements. Analogous with what has been said above, an adjusted arrangement of the receiving element or elements on the reception side affords the opportunity of selecting delimited incoming radiation, i.e. directional sensitivity may be obtained.

FIG. 3 illustrates a section through the chamber 22 in the longitudinal direction of the opening 23, and further illustrates how departing radiation is not permitted to take place directly, but only after some reflections, due to the opening 23 starting a distance from the LED 20, i.e. the area round the LED's is entirely covered in.

It has previously been mentioned that the inner surfaces of the chamber serve as mirror surfaces, even in respect of the elongate side surfaces of the chamber. The result of this is that the ray paths become more complicated in practice than what has been shown in principle in conjunction with FIGS. 1–3.

FIG. 4 schematically illustrates lateral ray propagation, taking into account reflection by the side walls in combination with reflection by the top and bottom surfaces. Reference denotations are the same as in FIGS. 2 and 3 for corresponding parts. As a result of reflection by the side members, the four transmitters 18–21 may be said to be equivalent to twelve transmitters placed below an infinitely wide upper member 24 provided with an opening 23. The reflecting effect of the right hand side wall corresponds to the transmitters 18a–21a. In the same way, the transmitters 18b–21b correspond to reflection by the left hand side wall.

The effect of reflection by the bottom surface corresponds to a row of transmitters 28 placed symmetrically in relation to the plane of the bottom surface. Two reflections in the bottom surface before radiation passes through the opening 23 correspond to the transmitter row 29. Each reflection by the bottom surface therefore corresponds to a displacement of the transmitter row a distance corresponding to double the distance between the top and bottom surfaces in the chamber. The exiting beam will therefore be narrower after more reflections. This is apparent from the rays 25, 27 and 25b, 27b, respectively. A similar argument can be put forward for other cross sectional shapes of the chamber also, e.g. a circular cross section.

Figure 5:
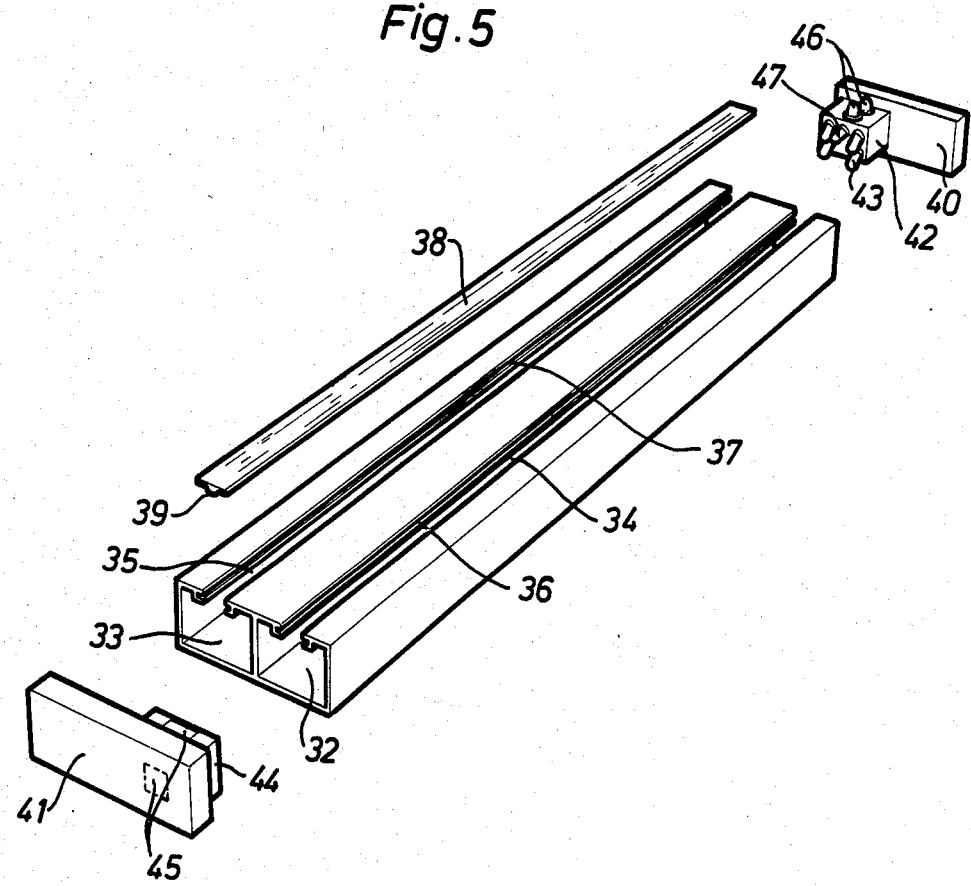
FIG. 5 illustrates a practical embodiment of an apparatus in accordance with the invention.

The practical embodiment illustrated in FIG. 5 comprises a profile 31 having two cavities 32, 33 intended to form chambers. Each cavity is provided with an opening or gap 34, 35 the side edges of which are provided with grooves 36, 37 forming flanges, for accomodating a transparent protective strip 38 (only one illustrated) which may be implemented with a lens-like protuberance 39 for further refractive alignment of the rays. The provision of a covered portion of the openings can be arranged by making the end portions of the strips opaque. The ends of the profile are adapted for accommodating end members 40, 41 of which the member 40 carries a unit 42 including four LED's 43 for coaction with the cavity 33 forming one of the chambers, and the end member 41 carries a unit 44 including the receiving element 45, for coaction with the cavity 32 forming the second chamber. Should there be the requirement of very long detecting distance, it may also be suitable to arrange direct-radiating LED's further to the reflected radiation coming from the LED's 43. Two such LED's 46 are thus arranged in the embodiment illustrated, these being placed on the side of the unit 42 facing towards the opening 34. In some cases it is furthermore suitable to place a LED 47, emitting parallel to the opening 35, i.e. straight along the chamber. By such an arrangement the reflected signal from an object approaching the apparatus can be kept to acceptable values since, when using radiation solely reflected within the chamber, the received signal become attenuated for short distances to the chamber, due to the directional action.

The end members may contain all the necessary electronics for the function of the apparatus. If no direct outgoing radiation, such as obtained with the LED's 46 is desirable, the protective strip can be made from opaque material or be provided with a non-transparent coating at the portion above the LED's.

It is naturally possible to train the LED's and/or receiving means in relation to the bottom surface in the respective chamber such as to adapt to prevailing operating conditions and requirements. An embodiment may be conceived within the scope of the invention, in which a bar of transparent plastics material, for example, is used to form a chamber. All the elongate sides are then provided with a reflecting coating, but for forming an "opening" an elongate portion is left untreated. The elongate sides can subsequently be provided with a protective coating for the reflecting surfaces. LED's and photocell means can then be fitted or moulded together with the bar material at the respective end surfaces. If, for example, it is desired to protect the mirror surfaces in the chambers in the illustrated embodiments against moisture or the like, the respective chamber can be filled with some transparent material, e.g. plastics. As will be seen, there is achieved by the invention a very simple and well adapted structure suitable for placing adjacent a door frame for direction towards the area to be monitored.

I claim:

1. Apparatus for photoelectric detection of objects comprising first elongate means and second elongate means, said first and second elongate means being juxtaposed and parallel to one another, each of said elongate means having passage means for passing radiation therethrough, transmitting means for transmitting radiation disposed at one longitudinal end of said first elongate means, receiving means for receiving radiation disposed at the opposite longitudinal end of said second elongate means, reflection means on each of said first and second elongate means defining surfaces providing for reflecting radiation, said transmitting means transmitting radiation which reflects on said surfaces of said first elongate means before passing through said passage means in said first elongate means with the rays reflected in said first elongate means a plurality of times being in the majority of the rays passing through said passage means in said first elongate means such that maximum radiation intensity occurs straight out from said passage means of said first elongate means, said receiving means receiving radiation which has struck an object and which has been reflected back to pass through said passage means in said second elongate means and which reflects on said surfaces of said second elongate means on its way to said receiving means.

2. Apparatus according to claim 1, wherein said first and second elongate means each comprises hollow compartments, each of said hollow compartments having a wall, said passage means comprising an opening in each of said walls.

3. Apparatus according to claim 2, wherein said surfaces comprise mirror surfaces on the inside of each of said hollow compartments.

4. Apparatus according to claim 1, wherein said transmitting means and said receiving means are spaced outwardly of the longitudinal ends of the respective passage means.

5. Apparatus according to claim 1, wherein means defining grooves are disposed along the longitudinal edges of said openings, and transparent protective strips disposed in said grooves.

6. Apparatus according to claim 5, wherein said protective strips are provided with a protruding lens-like portion extending longitudinally thereof.

7. Apparatus for photoelectric detection of objects comprising elongate chamber means having a first elongate compartment and a second elongate compartment, said first and second compartments being juxtaposed and parallel to one another, each of said compartments having means defining an opening for passing radiation, transmitting means for transmitting radiation at one longitudinal end of said first compartment, receiving means for receiving radiation at an opposite longitudinal end of said second compartment, reflection means on the inner surfaces of each of said first and second compartments for reflecting radiation, said transmitting means transmitting radiation which reflects on said inner surfaces of said first compartment before passing out through said opening in said first compartment with the rays reflected in said first compartment a plurality of times being in the majority of the rays passing through said opening of said first compartment such that maximum radiation intensity occurs straight out from said opening in said first compartment, said receiving means receiving radiation which has struck an object and which has been reflected back to pass through said opening in said second compartment and which reflects on said inner surfaces of said second compartment on its way to said receiving means.

8. Apparatus according to claim 7, wherein said transmitting means is arranged to be trained in different directions relative to the longitudinal surfaces of said first compartment.

9. Apparatus according to claim 7, wherein said receiving means is arranged to be trained in different directions relative to the longitudinal surfaces of said second compartment.

10. Apparatus according to claim 7, wherein said transmitting means comprises a plurality of radiation transmitting elements, some of said elements being trained inwardly into said first compartment, other of said elements being trained outwardly toward said passage means in said first compartment.

11. Apparatus according to claim 8, wherein said first and second elongate means comprises a bar of transparent material, said surfaces being mirror surfaces on the sides of said bars, said passage means being a non-mirrored portion on said bars.

* * * * *